Oct. 30, 1945.   G. ZINDEL, JR   2,388,203
VIEWING DEVICE FOR CATHODE RAY TUBE SCREENS AND THE LIKE
Filed Sept. 10, 1942
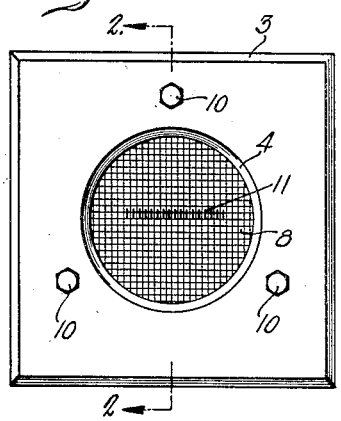
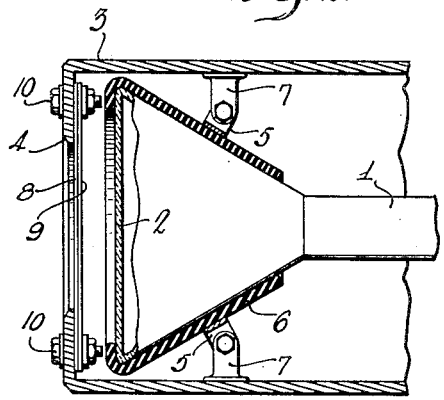
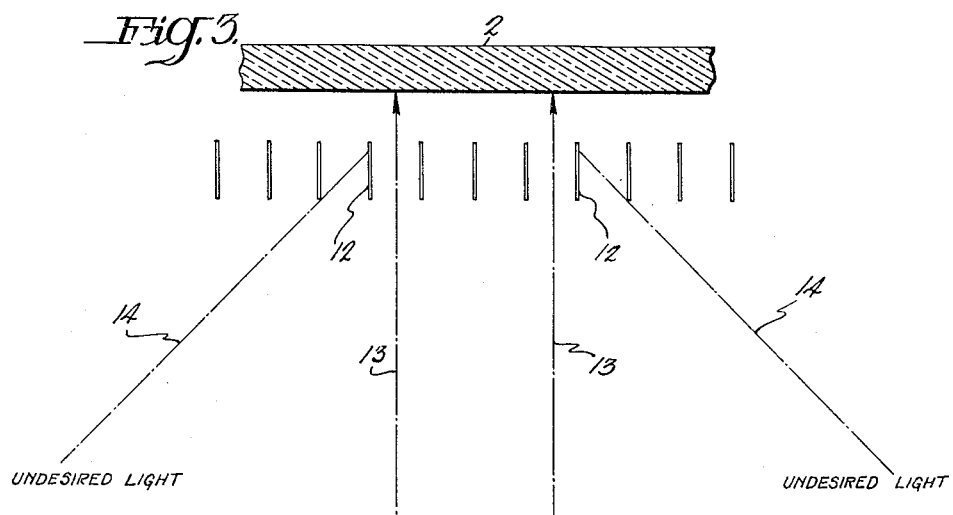
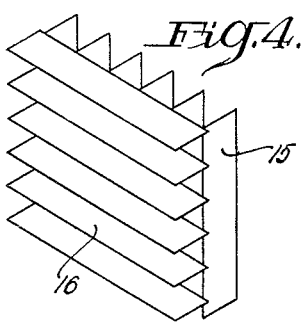
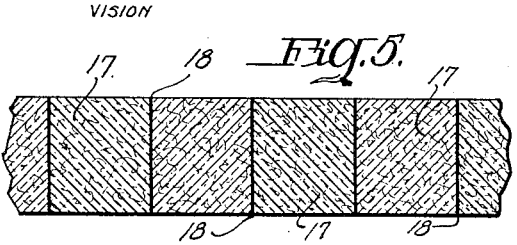
Inventor:-
George Zindel Jr.
by his Attorneys
Howson & Howson Patented Oct. 30, 1945

2,388,203

UNITED STATES PATENT OFFICE 2,388,203

VIEWING DEVICE FOR CATHODE-RAY TUBE SCREENS AND THE LIKE

George Zindel, Jr., Elkins Park, Pa., assignor to Philco Radio & Television Corporation, Philadelphia, Pa., a corporation of Delaware Application September 10, 1942, Serial No. 457,858

2 Claims. (Cl. 250—164)

This invention relates to a novel viewing device or light mask for use in conjunction with the screen of a cathode ray tube or the like.

In certain applications of cathode ray tubes, it has been customary in the past to employ a hood to exclude light while viewing the image screen of the tube. Such practice is subject to certain objections or annoyances. The observer is impeded by the bulky projecting hood, and it is therefore impossible to make a quick observation of the screen. Moreover, the fact that the length of the hood is fixed may be disadvantageous, as the optimum viewing distance varies with different individuals.

The principal object of the present invention is to provide a novel and simple viewing device which eliminates the objections and annoyances of the above-mentioned method and which enables an observer to view the screen of a cathode ray tube quickly, easily and conveniently.

A more specific object of the invention is to provide a novel viewing device employing at least one louver structure for excluding extraneous light and permitting the viewing of a cathode ray tube screen with unusual facility.

A further object of the invention is to provide a novel viewing device of this character employing one or more sheets of plastic material formed to provide a louver structure.

Other objects and features of the invention will appear hereinafter.

In the accompanying drawing:

Fig. 1 is a face view of a device embodying the invention;

Fig. 2 is a sectional view taken along line 2—2 of Fig. 1;

Fig. 3 illustrates the application of a louver structure according to the invention;

Fig. 4 illustrates in perspective a multiple louver arrangement preferably employed in accordance with the invention; and Fig. 5 is a greatly enlarged sectional view of the sheet material which is preferably employed.

Referring to Figs. 1 and 2, there is shown a portion of a cathode ray tube 1 having the usual screen or image viewing surface 2 at its enlarged end. The tube 1 is mounted within an opaque housing 3 having an opening 4 adjacent the screen of the tube. In the specific illustration, the tube is supported by a member 5 and is cushioned by a sleeve 6 formed of rubber or the like. The supporting member 5 is carried by brackets 7 secured to the housing 3.

In accordance with the present invention, a louver structure is provided within the opening 4 and in proximity to screen 2 for the purpose of viewing the screen without interference from extraneous light. Preferably, the louver structure comprises two adjacent thin sheets 8 and 9 which in the illustrated structure are secured to the apertured end of the housing 3 by means of bolts 10 or the like. It will be understood, of course, that the sheets may be secured together, if desired, and applied directly to the face of the tube.

Each of the sheets 8 and 9 embodies a louver structure with the louver elements of the respective sheets preferably arranged at right angles to one another, as shown in Fig. 1. These louver elements are arranged so that they permit observation of the screen 2 through the areas between them while excluding all light except that within a predetermined angle of incidence, as will be explained presently. In Fig. 1, calibration lines 11 on the screen 2 are clearly visible through the areas between the louver elements. It will be understood, of course, that the invention is applicable to any type of cathode ray tube such as those employing some desired indicia or calibrations, as well as those used in television.

The principle of the invention may be understood more clearly by reference to Fig. 3 in which a portion of screen 2 is greatly enlarged. On the same enlarged scale, there are shown opaque louver elements 12 which are so constructed and arranged that the louver structure is pervious to light only through an angle of incidence of about 45°. In this illustration, two lines of vision 13 are shown in dot-and-dash lines, while two rays 14 of undesired light are similarly represented. It will be seen that such light rays strike the opaque louver elements and are prevented from impinging upon the screen 2.

In Fig. 4, two sets of louver elements 15 and 16 are shown arranged at right angles to one another. By such arrangement, undesired light from any direction is effectively excluded.

Although it is within the scope of the invention to employ a single set of louver elements, it is preferred to employ two sets of elements to provide greater exclusion of extraneous light.

It is also within the scope of the invention to employ concentric circular louver elements but it is preferred to use flat parallel elements as illustrated.

Preferably each of the louver structures 8 and 9, shown in Figs. 1 and 2, comprises plastic sheet material known commercially as "Louverplas." Such material is light in weight and is very durable. A cross section of a portion of such sheet material is shown greatly enlarged in Fig. 5. This material is a laminated cellulose acetate plastic which is manufactured in sheets approximately .060 inch in thickness. As shown in Fig. 5, the sheet comprises transparent sections or areas of cellulose acetate material 17 separated by layers 18 of an opaque cement or binder. The width of each transparent section 17 is about .040 inch while the width of each cement layer is approximately .003 inch. It has been found that such sheet material is very well suited for use as a light mask in combination with the screen of a cathode ray tube. It will be understood, of course, that the thickness of the sheet material and the dimensions of its components may be varied to give varying degrees of exclusion of light.

By the use of a viewing device constructed according to the present invention, the screen of a cathode ray tube is made clearly visible without the necessity of employing a hood as was done in the past. The device effectively masks the screen against extraneous light and renders it clearly visible from the front. The observer may view the screen from a substantial distance if he so desires, and is not impeded by a projecting hood. Thus, the observer is enabled to view the screen quickly and efficiently.

As indicated above, the invention is capable of various modifications and is not limited to the specific structure illustrated.

I claim:

1. In combination with a cathode ray tube having a viewing screen, a viewing device comprising a light mask in proximity to said screen, said mask comprising a first thin plastic sheet having alternate transparent and opaque elements, and a second thin plastic sheet adjacent said first sheet and having alternate transparent and opaque elements disposed substantially at right angles to those of said first sheet, said elements being so constructed and arranged that the screen may be viewed by an observer through said transparent elements and the screen is shielded by said opaque elements from extraneous light.

2. In combination with a cathode ray tube having a viewing screen, an opaque enclosure about said screen having a wall in proximity to the screen, and a viewing window in said wall including a pair of adjacent thin plastic sheets each having alternate transparent and opaque elements, with the opaque elements of one sheet disposed substantially at right angles to those of the other sheet, said elements being so constructed and arranged that the screen may be viewed by an observer through said transparent elements and the screen is shielded by said opaque elements from extraneous light impinging on said window at a substantial angle to the line of vision of the observer.

GEORGE ZINDEL, Jr.